US011125205B2

(12) United States Patent
Hynum et al.

(10) Patent No.: US 11,125,205 B2
(45) Date of Patent: Sep. 21, 2021

(54) SYSTEMS AND METHODS FOR JOINING BLADE COMPONENTS OF ROTOR BLADES

(71) Applicant: General Electric Company, Schenectady, NY (US)

(72) Inventors: Daniel Alan Hynum, Simpsonville, SC (US); James Robert Tobin, Simpsonville, SC (US); Christopher Daniel Caruso, Greenville, SC (US); Aaron A. Yarbrough, Greenville, SC (US)

(73) Assignee: General Electric Company, Schenectady, NY (US)

( * ) Notice: Subject to any disclaimer, the term of this patent is extended or adjusted under 35 U.S.C. 154(b) by 766 days.

(21) Appl. No.: 14/852,945

(22) Filed: Sep. 14, 2015

(65) Prior Publication Data

US 2017/0074236 A1 Mar. 16, 2017

(51) Int. Cl.
*B23K 37/04* (2006.01)
*F03D 1/06* (2006.01)

(52) U.S. Cl.
CPC .................. *F03D 1/0675* (2013.01)

(58) Field of Classification Search
CPC .......... B23K 9/02; B23K 9/028; B23K 20/02; B23K 20/012; B23K 20/122; B23K 37/04; B23K 37/0453; B23K 37/0443
USPC ...................... 219/118, 78.01, 85.1, 158, 161
See application file for complete search history.

(56) References Cited

U.S. PATENT DOCUMENTS

| 3,384,183 A * | 5/1968 | Braverman ............... B64C 3/30 416/84 |
| 5,797,182 A * | 8/1998 | Furlan .................. B23K 1/0016 29/889.21 |
| 6,264,877 B1 | 7/2001 | Pallu De La Barriere |
| 7,704,024 B2 * | 4/2010 | Kootstra ................... B60P 3/40 410/44 |
| 7,946,803 B2 * | 5/2011 | Wobben ................ F03D 1/0641 415/4.3 |

(Continued)

FOREIGN PATENT DOCUMENTS

| CN | 101906251 | 8/2010 |
| JP | 2007-92716 | 4/2007 |

(Continued)

OTHER PUBLICATIONS

Teuwen, et al.; "Vacuum Infused Thermoplastic Composites for Wind Turbine Blades," 2008 Wind Turbine Blade Workshop, Sandia National Laboratories—Presentation—May 12-14, 2008; (22 pages).

*Primary Examiner* — Robert J Utama
*Assistant Examiner* — Ayub A Maye
(74) *Attorney, Agent, or Firm* — Dority & Manning, P.A.

(57) ABSTRACT

Systems and methods for joining blade components of a rotor blade are provided. A method includes positioning a first blade component and a second blade component such that a joint location of the first blade component and a joint location of the second blade component are proximate each other. The method further includes applying a force to an outer surface of the second blade component and an opposing force to an inner surface of the second blade component. The force and opposing force maintain an aerodynamic contour of the second blade component. The method further includes connecting the joint location of the first blade component and the joint location of the second blade component together.

16 Claims, 8 Drawing Sheets

(56) References Cited

U.S. PATENT DOCUMENTS

| | | | |
|---|---|---|---|
| 8,317,479 B2 | 11/2012 | Vronsky et al. | |
| 8,602,700 B2 * | 12/2013 | Johnson | F03D 13/40 410/44 |
| 8,657,581 B2 | 2/2014 | Pilpel et al. | |
| 8,673,106 B1 | 3/2014 | Jolley et al. | |
| 8,747,098 B1 | 6/2014 | Johnson et al. | |
| 8,961,142 B2 | 2/2015 | Wansink | |
| 8,967,929 B2 * | 3/2015 | Frederiksen | B60P 3/40 410/44 |
| 8,992,813 B2 | 3/2015 | Robbins et al. | |
| 2009/0087318 A1 * | 4/2009 | Althoff | F03D 1/0675 416/226 |
| 2009/0148300 A1 * | 6/2009 | Driver | B29C 65/3412 416/223 R |
| 2009/0169323 A1 * | 7/2009 | Livingston | F03D 1/0675 410/120 |
| 2010/0139092 A1 * | 6/2010 | Sathian | B23K 9/025 29/889 |
| 2010/0143130 A1 * | 6/2010 | Cairo | F03D 1/065 416/84 |
| 2010/0304170 A1 * | 12/2010 | Frederiksen | B29C 65/40 428/542.8 |
| 2011/0030183 A1 * | 2/2011 | Livingston | F03D 1/065 29/281.3 |
| 2011/0097211 A1 | 4/2011 | Rudling | |
| 2012/0213642 A1 * | 8/2012 | Wang | F03D 1/0675 416/232 |
| 2013/0164133 A1 | 6/2013 | Grove-Nielsen | |
| 2013/0195655 A1 * | 8/2013 | Kerner | F03D 7/0236 416/1 |
| 2013/0224030 A1 * | 8/2013 | Kimura | F01D 5/32 416/220 R |
| 2013/0224032 A1 * | 8/2013 | Busbey | F03D 1/0633 416/223 R |
| 2013/0328241 A1 * | 12/2013 | Obrecht | B29C 33/308 264/299 |
| 2014/0140855 A1 * | 5/2014 | Arendt | F03D 1/0675 416/233 |
| 2014/0186175 A1 * | 7/2014 | Baehmann | F01D 5/147 416/1 |
| 2014/0295187 A1 | 10/2014 | Jacobsen et al. | |
| 2014/0363294 A1 * | 12/2014 | Lamberton | G01N 25/48 416/61 |

FOREIGN PATENT DOCUMENTS

| | | |
|---|---|---|
| WO | WO 2010/025830 A2 | 3/2010 |
| WO | WO 2011/088835 A2 | 7/2011 |
| WO | WO 2011/098785 A2 | 8/2011 |
| WO | WO 2015/015202 A1 | 2/2015 |

* cited by examiner

SYSTEMS AND METHODS FOR JOINING BLADE COMPONENTS OF ROTOR BLADES

FIELD OF THE INVENTION

The present disclosure relates generally to rotor blades, such as wind turbine rotor blades, and more particularly to systems and methods for joining blade components of the rotor blades.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves. The spar caps are typically constructed of various materials, including but not limited to glass fiber laminate composites and/or carbon fiber laminate composites. The shell of the rotor blade is generally built around the spar caps of the blade by stacking layers of fiber fabrics in a shell mold. The layers are then typically infused together, e.g. with a thermoset resin.

Such rotor blades, however, are not without issues. For example, the bond lines of typical rotor blades are generally formed by applying a suitable bonding paste or compound along the bond line with a minimum designed bond width between the shell members. These bonding lines are a critical design constraint of the blades as a significant number of turbine blade field failures occur at the bond-line. Separation of the bond line along the leading and/or trailing edges of an operational turbine blade can result in a catastrophic failure and damage to the wind turbine.

An additional concern when joining components of a rotor blade together is maintaining the aerodynamic contour of the rotor blade. In many cases, due the complexity of the joining process, the aerodynamic contour of one or more components being joined can be altered from a desirable aerodynamic contour for that component. Post-processing of that component must then occur to obtain the desired aerodynamic contour.

Accordingly, improved systems and methods for joining blade components of rotor blades are desired. In particular, systems and methods which reduce the time and expense associated with joining of the blade components, and which maintain the aerodynamic contour of the rotor blade, would be advantageous.

BRIEF DESCRIPTION OF THE INVENTION

Aspects and advantages of the invention will be set forth in part in the following description, or may be obvious from the description, or may be learned through practice of the invention.

In accordance with one embodiment, a method for joining blade components of a rotor blade is provided. The method includes positioning a first blade component and a second blade component such that a joint location of the first blade component and a joint location of the second blade component are proximate each other. The method further includes applying a force to an outer surface of the second blade component and an opposing force to an inner surface of the second blade component. The force and opposing force maintain an aerodynamic contour of the second blade component. The method further includes connecting the joint location of the first blade component and the joint location of the second blade component together.

In accordance with another embodiment, a method for joining blade components of a rotor blade is provided. The method includes positioning a first blade component and a second blade component such that a joint location of the first blade component and a joint location of the second blade component are proximate each other. The first blade component and the second blade component each include a thermoplastic resin. The method further includes applying a force to an outer surface of the second blade component and an opposing force to an inner surface of the second blade component. The force and opposing force maintain an aerodynamic contour of the second blade component. The method further includes welding the joint location of the first blade component and the joint location of the second blade component together.

In accordance with another embodiment, a system for joining a first blade component and a second blade component of a rotor blade are provided. The system includes a fixture for supporting a second blade component such that a joint location of the first blade component is proximate a joint location of the second blade component. The fixture includes a frame, and an arm connected to the frame and configured for contacting an outer surface of the second blade component, the arm rotatable about an axis of the frame. The fixture further includes an inflatable bladder configured for contacting an inner surface of the second blade component.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
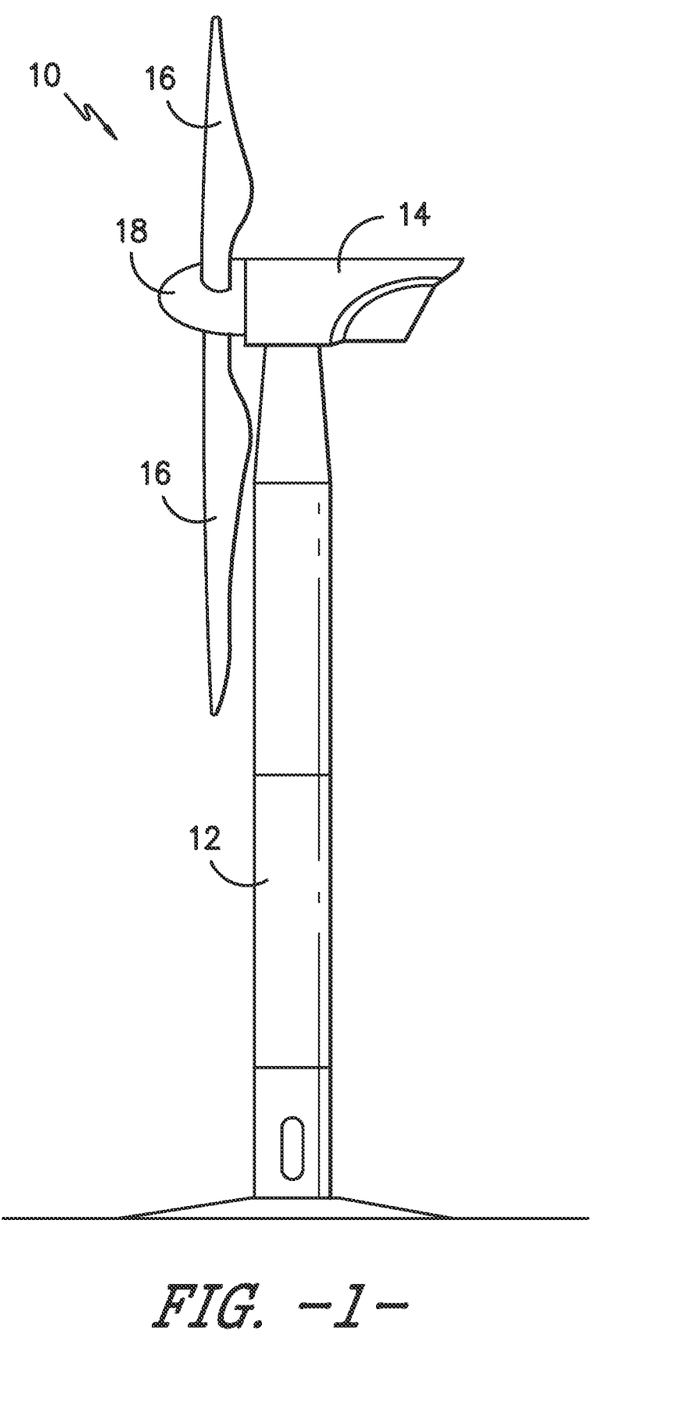
FIG. 1 is a perspective view of a wind turbine in accordance with one embodiment of the present disclosure.

Referring now to the drawings, FIG. 1 illustrates one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The rotor blades 16 are considered to be uptower due to being erected on the tower 12 and wind turbine 10 generally, which is illustrated at an erection site for the wind turbine 10. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbines, but may be utilized in any application having rotor blades.

Figure 2:
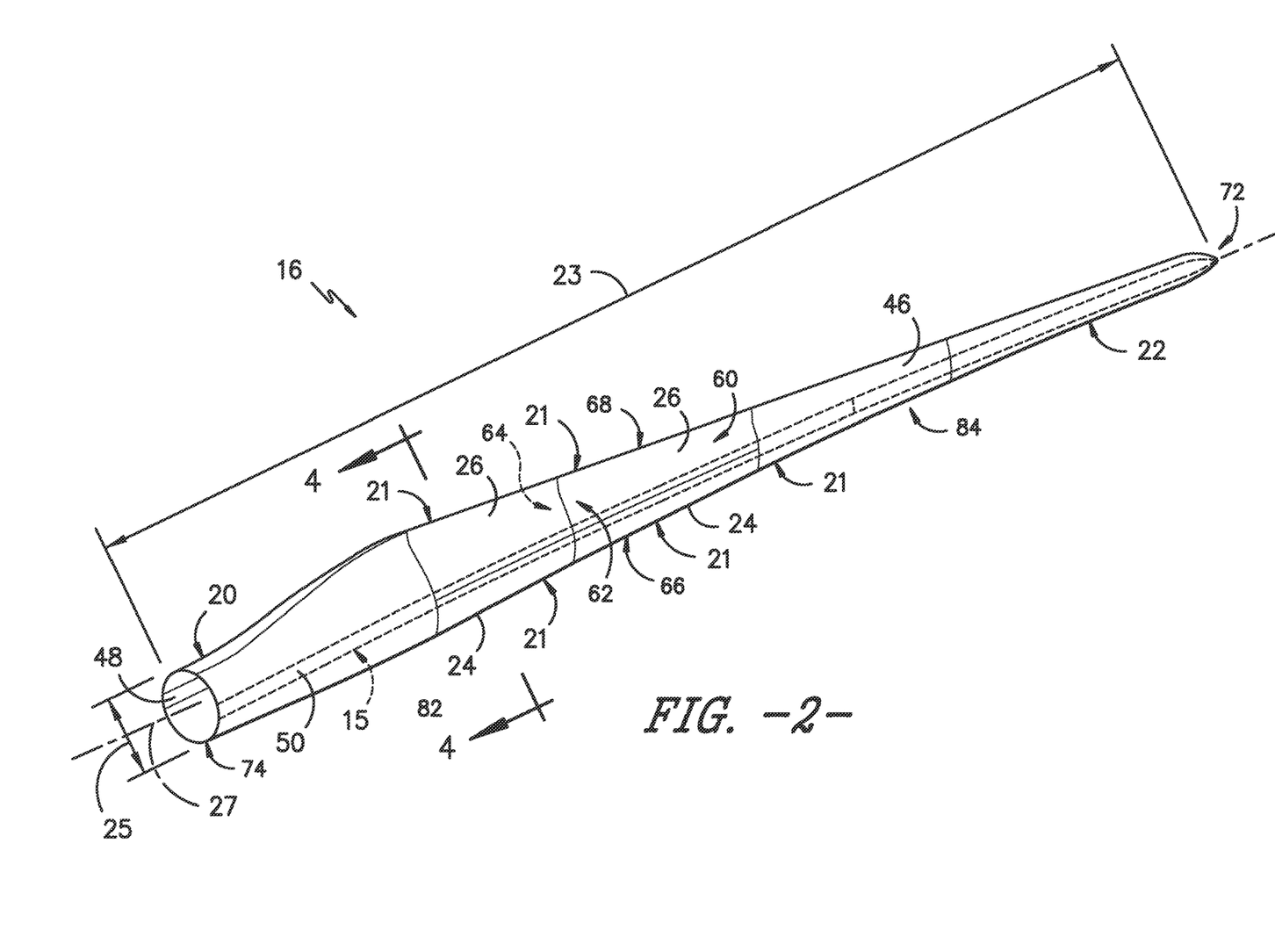
FIG. 2 is a perspective view of a formed rotor blade in accordance with one embodiment of the present disclosure.
Figure 3:
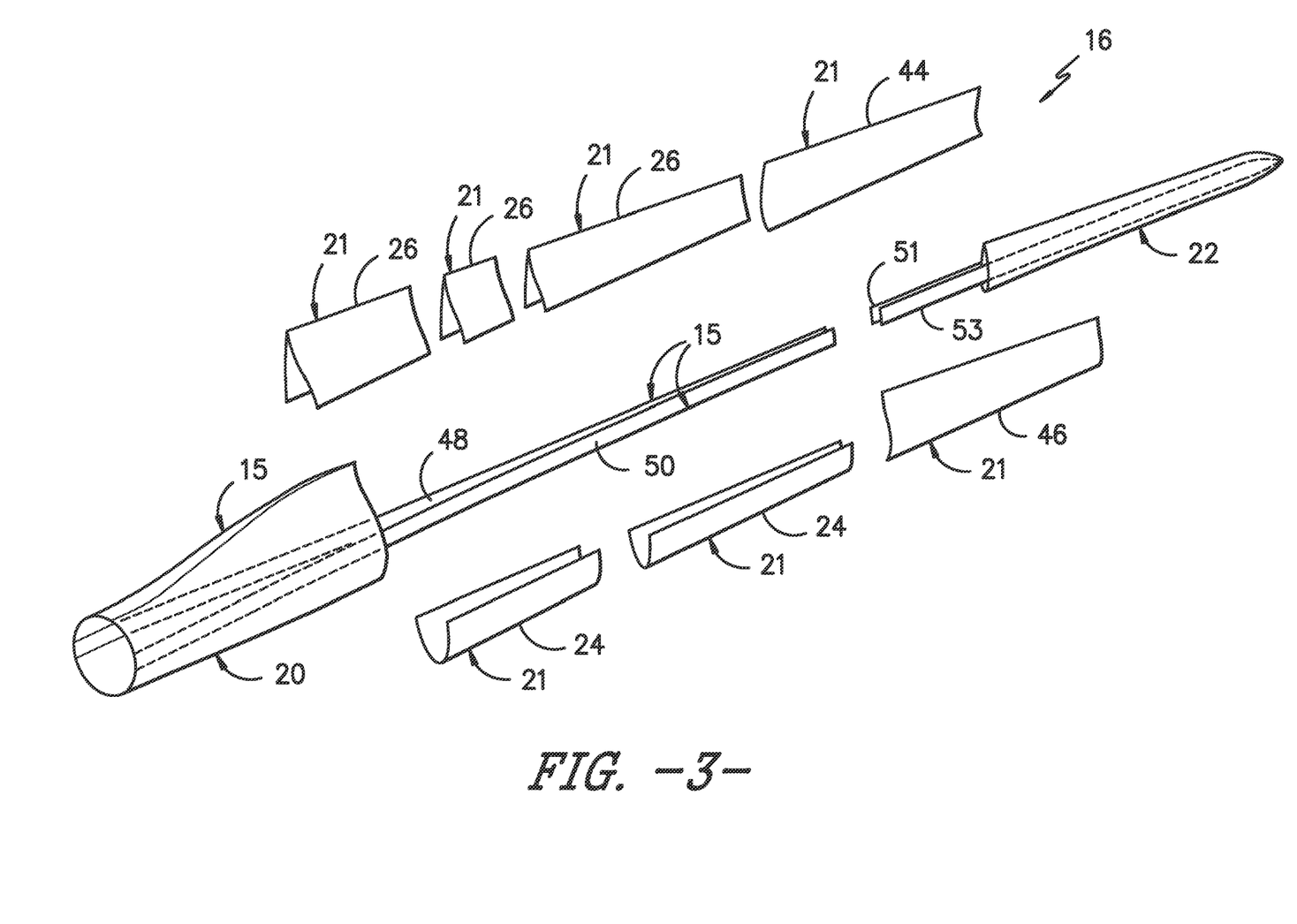
FIG. 3 is an exploded view of the rotor blade of FIG. 2.

Referring now to FIGS. 2 and 3, various views of rotor blades 16 according to the present disclosure are illustrated. As is generally understood, a rotor blade 16 according to the present disclosure may include an exterior surface 60 defining a pressure side 62, a suction side 64, a leading edge 66, and a trailing edge 68. The pressure side 62 and suction side 64 may each extend between the leading edge 66 and the trailing edge 68. The exterior surface 60 may extend between a blade tip 72 and a blade root 74 in a generally span-wise direction, as discussed below.

The pressure side, suction side, leading edge and trailing edge may be generally aerodynamic surfaces having generally aerodynamic contours, as is generally known in the art. Thus, the exterior surface of the rotor blade 16 may define an aerodynamic profile, such as an airfoil-like cross-sectional profile, for the rotor blade 16. The aerodynamic profile includes the pressure side, suction side, leading edge and trailing edge.

The rotor blade 16 may, in some embodiments, be curved. Curving of the rotor blade 16 may entail bending the rotor blade 16 in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

The rotor blade 16 may further define a chord 23 and a span 25 extending in chord-wise and span-wise directions, respectively. The chord may vary throughout the span of the rotor blade 16. Thus, a local chord may be defined for the rotor blade 16 at any point on the rotor blade 16 along the span.

Figure 4:
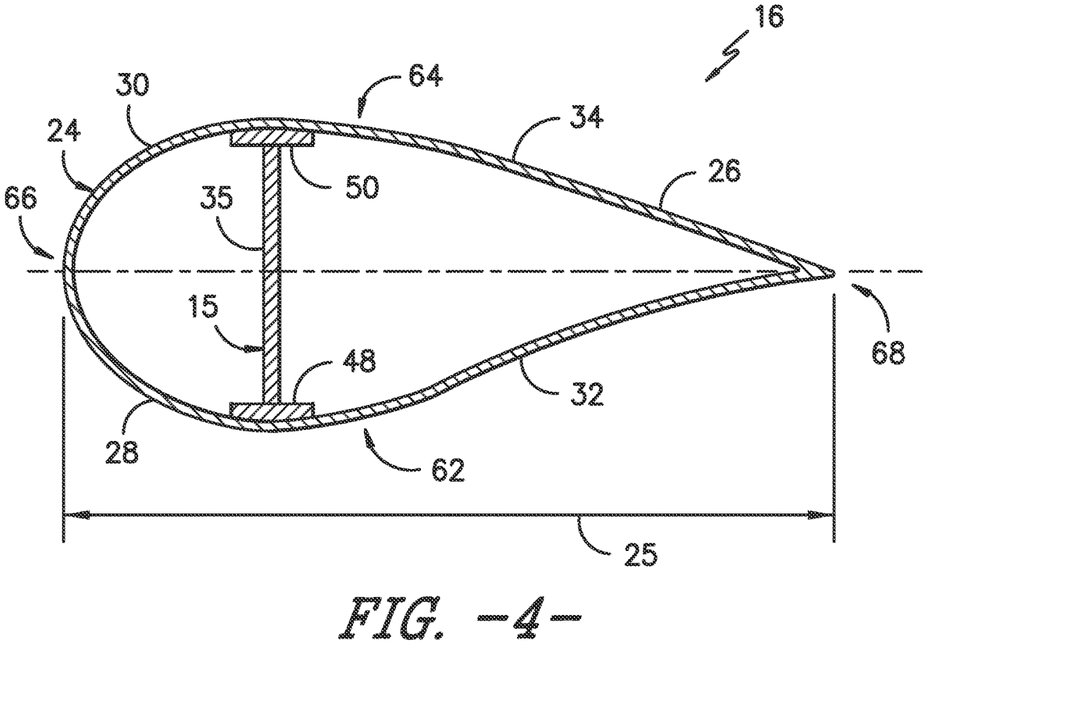
FIG. 4 is a cross-sectional view, along the line 4-4 of FIG. 2, of a rotor blade in accordance with one embodiment of the present disclosure.

Additionally, as shown in FIGS. 2, 3 and 4, the rotor blade 16 may define an inboard portion 82 and an outboard portion 84. The inboard portion may be a span-wise portion of the rotor blade 16 extending from the root. For example, the inboard portion may, in some embodiments, include approximately 33%, 40%, 50%, 60%, 67%, or any percentage or range of percentages therebetween, or any other suitable percentage or range of percentages, of the span from the root. The outboard portion may be a span-wise portion of the rotor blade 16 extending from the tip, and may in some embodiments include the remaining portion of the rotor blade 16 between the inboard portion and the tip. Additionally or alternatively, the outboard portion may, in some embodiments, include approximately 33%, 40%, 50%, 60%, 67%, or any percentage or range of percentages therebetween, or any other suitable percentage or range of percentages, of the span from the tip.

As shown in FIGS. 2 and 3, a rotor blade 16 in accordance with the present disclosure includes a main blade structure 15 constructed, at least in part, from a thermoset or a thermoplastic resin and at least one outer blade segment 21 configured with the main blade structure 15. More specifically, as shown, the rotor blade 16 includes a plurality of outer blade segments 21. The blade segment(s) 21 may also be constructed, at least in part, from a thermoset or a thermoplastic resin. The thermoplastic and/or the thermoset resin as described herein may optionally be reinforced with a fiber material, including but not limited to glass fibers, carbon fibers, metal fibers, or similar or combinations thereof, embedded in the resin to form a composite. Continuous or discontinuous fibers may be utilized. In exemplary embodiments, continuous fibers are utilized. The direction of the fibers may include biaxial, unidirectional, triaxial, or any other another suitable direction and/or combinations thereof. Further, the fiber content within a composite may vary depending on the stiffness required in the corresponding blade component, the region or location of the blade component in the rotor blade 16, and/or the desired weldability of the component.

More specifically, as shown, the main blade structure 15 may include any one of or a combination of the following: a pre-formed blade root section 20, a pre-formed blade tip section 22, one or more one or more continuous spar caps 48, 50, 51, 53, one or more shear webs 35 (FIG. 4), and/or any other suitable structural component of the rotor blade 16. Further, the blade root section 20 is configured to be mounted or otherwise secured to the rotor 18 (FIG. 1). As mentioned, the rotor blade 16 defines a span 23 that is equal to the total length between the blade root section 20 and the blade tip section 22. The rotor blade 16 also defines a chord 25 that is equal to the total length between a leading edge 66 of the rotor blade 16 and a trailing edge 68 of the rotor blade 16. As is generally understood, the chord 25 may generally vary in length with respect to the span 23 as the rotor blade 16 extends from the blade root section 20 to the blade tip section 22.

In some embodiments, as shown in FIGS. 2-3, the main blade structure 15 may include the blade root section 20 with one or more longitudinally extending spar caps 48, 50 infused therewith. For example, the blade root section 20 may be configured according to U.S. application Ser. No. 14/753,155 filed Jun. 29, 2015 entitled "Blade Root Section for a Modular Rotor Blade and Method of Manufacturing Same" which is incorporated by reference herein in its entirety. Similarly, the main blade structure 15 may include the blade tip section 22 with one or more longitudinally extending spar caps 51, 53 infused therewith. Further, the blade root spar caps 48, 50 may be configured to align with the blade tip spar caps 51, 53. Thus, the spar caps 48, 50, 51, 53 may generally be designed to control the bending stresses and/or other loads acting on the rotor blade 16 in a generally span-wise direction (a direction parallel to the span 23 of the rotor blade 16) during operation of a wind turbine 10. In addition, the spar caps 48, 50, 51, 53 may be designed to withstand the span-wise compression occurring during operation of the wind turbine 10. Further, the spar cap(s) 48, 50, 51, 53 may be configured to extend from the blade root section 20 to the blade tip section 22 or a portion thereof.

In addition, as shown in FIG. 4, the main blade structure 15 may include one or more shear webs 35 configured between the one or more spar caps 48, 50, 51, 53. More particularly, the shear web(s) 35 may be configured to increase the rigidity in the blade root section 20 and/or the blade tip section 22.

Referring to FIGS. 2-4, any number of outer blade segments 21 having any suitable size and/or shape may be generally arranged between the blade root section 20 and the blade tip section 22 along a longitudinal axis 27 in a generally span-wise direction. The blade segments 21 generally serve as the outer casing/covering of at least a portion of the rotor blade 16 (such as between the blade root section 20 and the blade tip section 22) and may define a generally aerodynamic profile, such as by defining a symmetrical or cambered airfoil-shaped cross-section. In additional embodiments, it should be understood that the blade segment portion of the blade 16 may include any combination of the segments described herein and are not limited to the embodiment as depicted. As mentioned, the blade segments 21 may be constructed of any suitable materials, including but not limited to a thermoset material or a thermoplastic material optionally reinforced with one or more fiber materials. More specifically, as generally shown in the figures, the blade segments 21 may include any one of or combination of the following blade segments: pressure side segments, suction side segments 46, leading edge segments 24 and/or trailing edge segments 26.

More specifically, as shown in FIG. 4, the leading edge segments 24 may have a forward pressure side surface 28 and a forward suction side surface 30. Similarly, each of the trailing edge segments 26 may have an aft pressure side surface 32 and an aft suction side surface 34. Thus, the forward pressure side surface 28 of the leading edge segment 24 and the aft pressure side surface 32 of the trailing edge segment 26 generally define a pressure side surface of the rotor blade 16. Similarly, the forward suction side surface 30 of the leading edge segment 24 and the aft suction side surface 34 of the trailing edge segment 26 generally define a suction side surface of the rotor blade 16.

It should additionally be noted that, in some embodiments, a blade component may be a surface feature. A surface feature is generally a component added to a surface, such as an exterior surface, of the rotor blade 16 to modify flow characteristics, lift characteristics, etc. of the rotor blade 16. For example, a surface feature may be a vortex generator. Vortex generators may be utilized to reduce flow separation during operation of a rotor blade 16. In some embodiments, a vortex generator may be generally fin-like. Alternatively, a vortex generator may have any suitable shape.

Additionally or alternatively, a surface feature may be a noise reducer. Noise reducers may be utilized to reduce noise generated by the wind flow over and away from a rotor blade 16. In some embodiments, a noise reducer may include a plurality of serrations. Additionally or alternatively, a noise reducer may include a plurality of bristles, or have any other suitable shape and/or configuration.

Further, a surface feature may be a winglet. Winglets may be utilized to increase lift at the tip 72 of a rotor blade 16. Still further, a surface feature may be a root enhancer or other suitable chord extension apparatus. Root enhancers may be utilized to increase lift at the root 74 of a rotor blade 16.

It should be understood that the present disclosure is not limited to the above disclosed surface features. Rather, any suitable device or apparatus configured on an exterior surface of a rotor blade 16 is within the scope and spirit of the present disclosure.

As discussed, the various blade components of the rotor blade 16, such as the main blade structure 15 and/or the various blade segments 21, may include a thermoset resin and/or a thermoplastic resin. Thermoplastic resins as described herein generally encompass a plastic material or polymer that is reversible in nature. For example, thermoplastic resins typically become pliable or moldable when heated to a certain temperature and return to a more rigid, solidified state upon cooling. Further, thermoplastic resins may include amorphous thermoplastic resins and/or semi-crystalline thermoplastic resins. For example, some amorphous thermoplastic resins may generally include, but are not limited to styrenes, vinyls, cellulosics, polyesters, acrylics, polysulphones, and/or imides. More specifically, example amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, example semi-crystalline thermoplastic resins may generally include, but are not limited to, polyolefins, polyamides, fluoropolymers, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material. The thermoset resins as described herein generally encompass a plastic material or polymer that is non-reversible in nature. For example, thermoset resins, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset materials.

Figure 5:
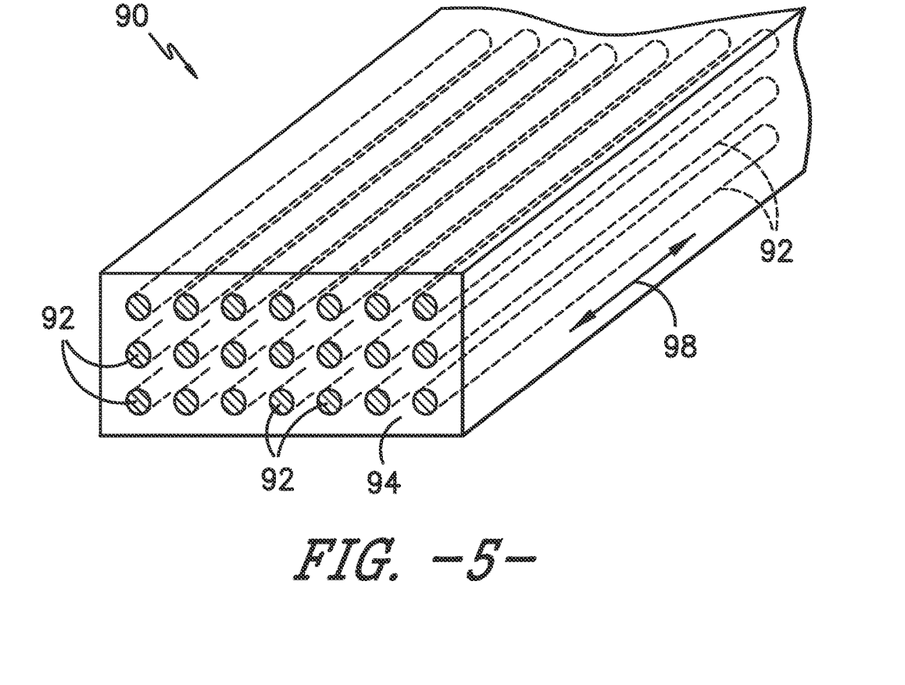
FIG. 5 is a perspective view of a portion of a composite utilized in various components of a rotor blade assembly in accordance with one embodiment of the present disclosure.

Referring briefly to FIG. 5, an embodiment of a composite 90 utilized in accordance with the present disclosure is provided. As illustrated, the composite 90 generally includes a resin 92 (which may be a thermoset or thermoplastic) and a plurality of fibers 94 embedded therein. In exemplary embodiments the fibers 94 are continuous, generally unidirectional fibers which extend along a longitudinal axis 98 as illustrated. Alternatively, discontinuous fibers may be utilized, and/or the fibers may extend at any suitable angles.

Referring now to FIGS. 6 through 10, the various disclosure is further directed to systems and methods for joining blade components of a rotor blade 16. Systems and methods as disclosed herein advantageously facilitate improved joints between the blade components, and advantageously reduce the time, cost and difficulty associated with such joining. Further, systems and methods as disclosed herein advantageously facilitate such joining while maintaining the aerodynamic contours of the blade components and rotor blade 16 generally.

Figure 9:
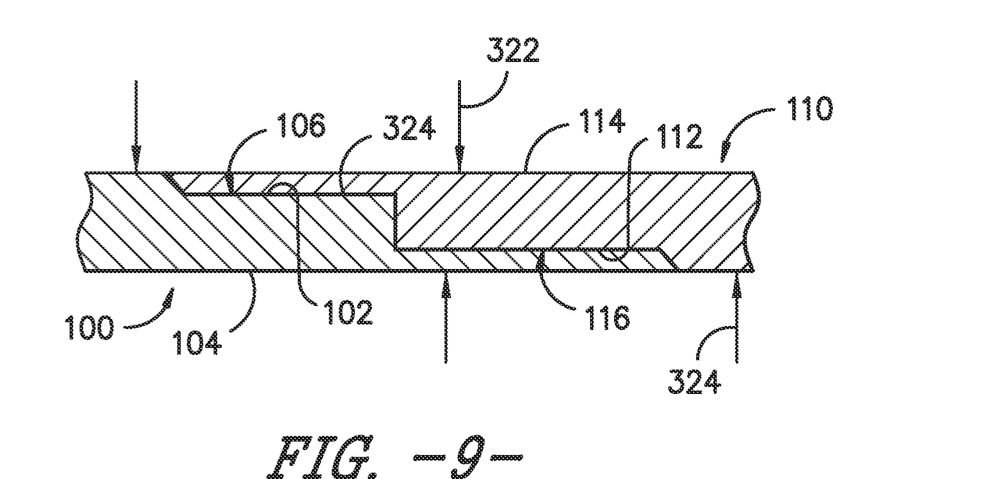
FIG. 9 is a cross-sectional view illustrating the joining of a first blade component and a second blade component in accordance with one embodiment of the present disclosure.

In accordance with the present disclosure, a first blade component 100 and a second blade component 110 may be joined together. Referring to FIG. 9, each blade component 100, 110 may have an inner surface 102, 112 and an outer surface 104, 114, respectively. A joint location 106, 116, respectively, may be defined on each blade component 100, 110. The joint locations 106, 116 are locations at which the blade components 100, 110 are joined to each other. In exemplary embodiments, the joint location 106 of the first component 100 may be on the outer surface 104 thereof and the joint location 116 of the second component 110 may be on the inner surface 112 thereof, or the joint location 106 of the first component 100 may be on the inner surface 102 thereof and the joint location 116 of the second component 110 may be on the outer surface 114 thereof. Further, in exemplary embodiments, the joint locations 106, 116 may be defined by cut-away portions and be, for example, lap joints or other suitable joints.

First blade component 100 may be any suitable component of main blade structure 15, such as root section 20, tip section 22, or a spar cap 48, 50, 51, 53, or may be any suitable blade segment 21, such as a leading edge segment 24, trailing edge segment 26, etc. Second blade component 100 may similarly be any suitable component of main blade structure 15, such as root section 20, tip section 22, or a spar cap 48, 50, 51, 53, or may be any suitable blade segment 21, such as a leading edge segment 24, trailing edge segment 26, etc. In some exemplary embodiments, such as for example, illustrated in FIG. 6, first blade component 100 is root section 20 and second blade component is a leading edge segment 24. In alternative exemplary embodiments, first blade component 100 is root section 20 and second blade component is a trailing edge segment 26.

Figure 6:
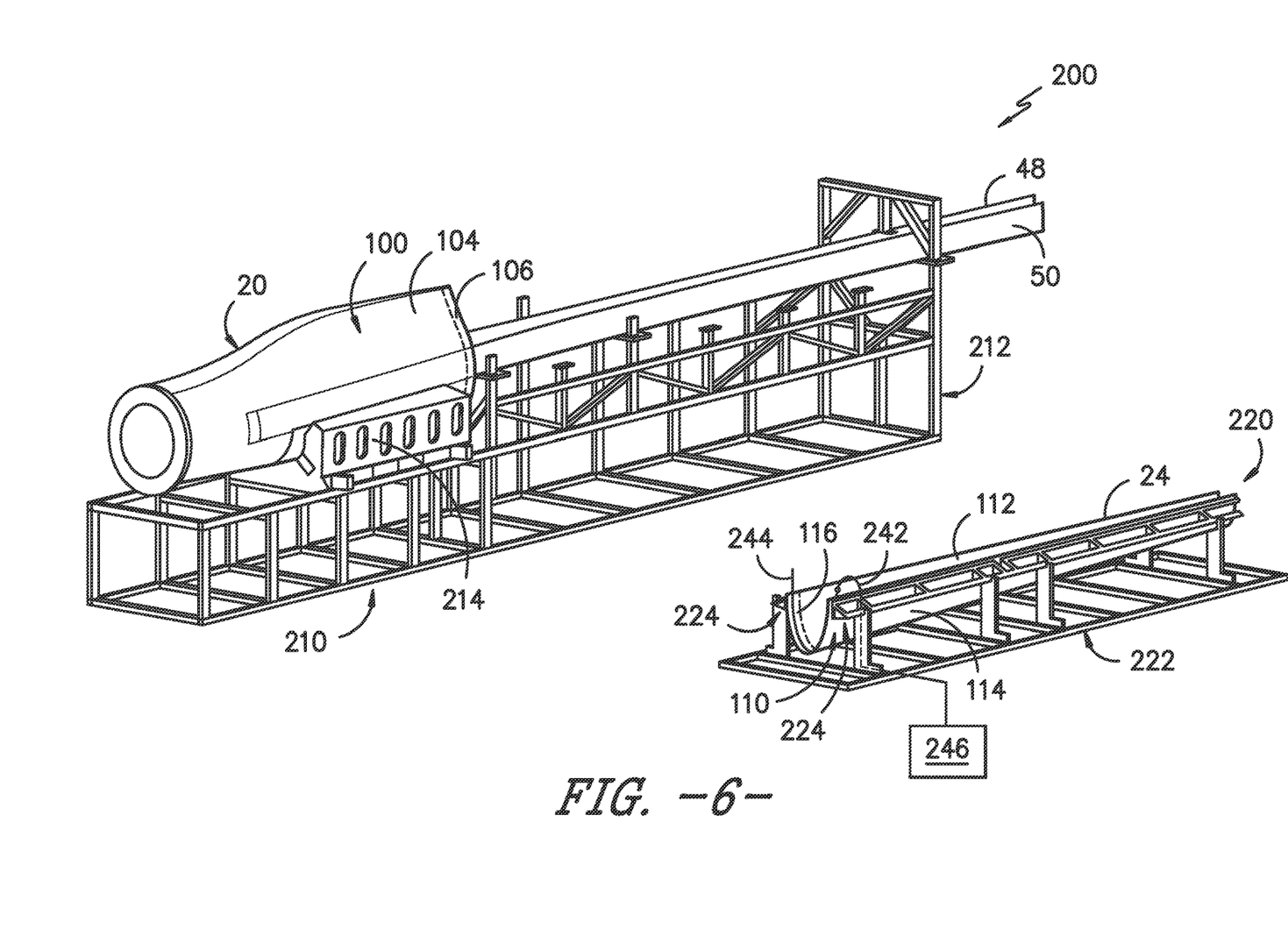
FIG. 6 is a perspective view illustrating fixtures for supporting blade components for joining thereof to form a rotor blade in accordance with one embodiment of the present disclosure.
Figure 7:
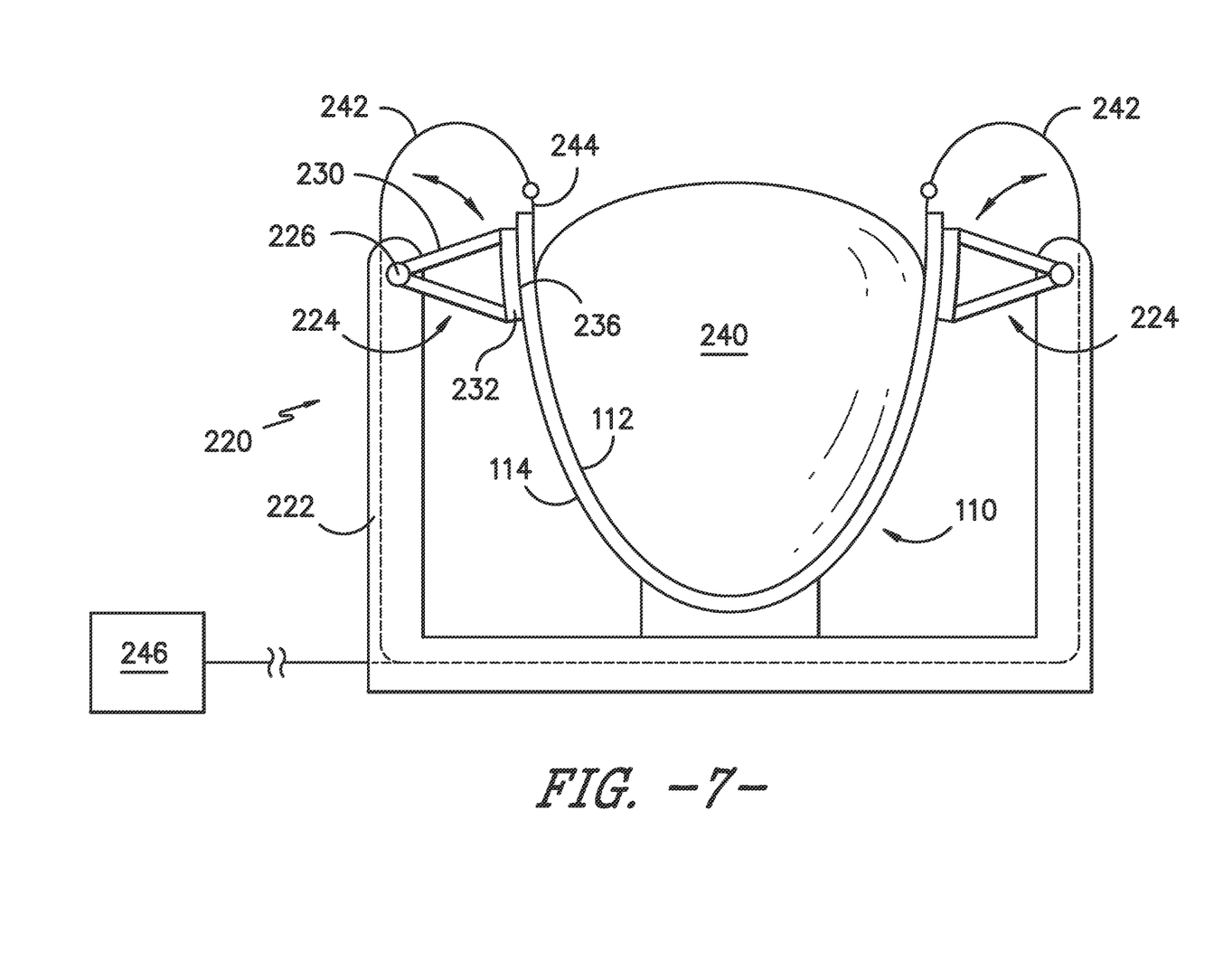
FIG. 7 is a cross-sectional view of a fixture for supporting a blade component for joining with another blade component to form a rotor blade in accordance with one embodiment of the present disclosure.
Figure 8:
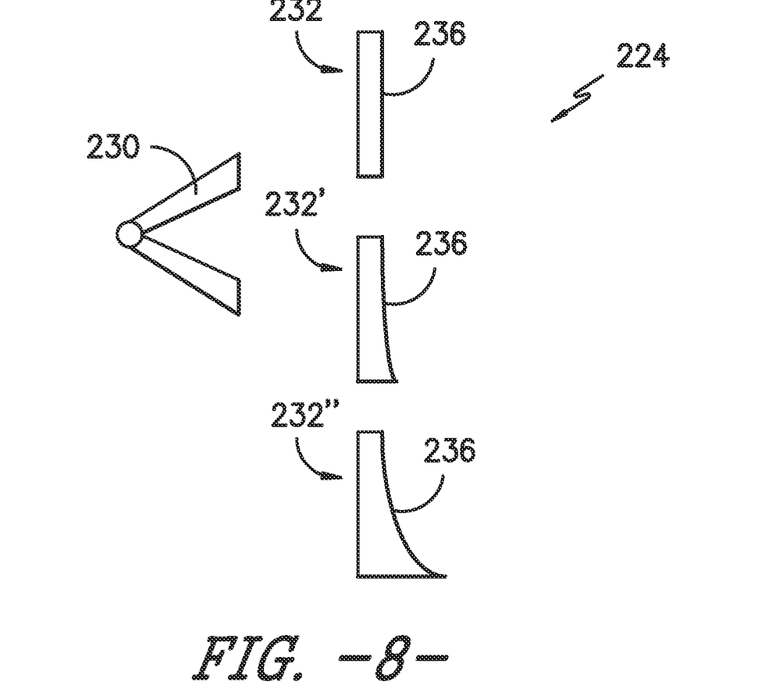
FIG. 8 illustrates the aerodynamic contours of various removable inserts for use with a fixture arm in accordance with one embodiment of the present disclosure.

FIGS. 6 through 8 illustrate embodiments of a system 200 for joining blade components 100, 110 of a rotor blade 16. For example, a first fixture 210 for supporting the first blade component 100 is illustrated. Fixture 210 may be used to arrange and/or orient the blade component 100 of the rotor blade 16 for joining with the second blade component 110. For example, as shown, the fixture may include a fixture frame 212, which may for example include a plurality of beams connected together. Fixture frame 212 may be configured to support and orient the blade component 100, which in the embodiment shown is a root section 20. Further, fixture 210 may also include a component cradle 214 configured to support and orient the blade component 100. The cradle 214 may, for example, have an inner surface with a contour that corresponds to an outer surface 104 contour of the blade component 100.

A second fixture 220 for supporting the second blade component 110 is additionally illustrated. Fixture 212 may be used to arrange and/or orient the blade component 110 of the rotor blade 16 for joining with the first blade component 100. For example, as shown, the fixture may include a fixture frame 222, which may for example include a plurality of beams connected together. Fixture frame 222 may be configured to support and orient the blade component 110, which in the embodiment shown is a blade segment 21, such as a leading edge segment 24.

Fixture 220 (as well as fixture 210) may additionally include features for maintaining the aerodynamic contour of the blade components 100, 110 during joining thereof. For example, as illustrated, fixture 220 may include one or more arms 224 that are connected to the frame 220 and which contact the outer surface 114 of the blade component 110. When the blade component 110 is placed in the fixture 220, portions of the outer surface 114 thereof may contact the arms 224.

In exemplary embodiments as illustrate, arms 224 may be rotatable about axes 226 of the frame 222. The axes 226 may, for example, be span-wise extending axes 226. Such rotation may facilitate placement of the blade component 110 in the fixture 220 and further facilitate the application of a force to the blade component 110, as discussed herein.

Referring to FIG. 8, in exemplary embodiments, an arm 224 may include a base 230 which extends from the frame 222 (and is rotatable about the frame 222 about axis 226) and one or more inserts 232. Each insert 232 may have a contact surface 236 which contacts the outer surface 114 of the blade component 110 when the blade component 110 is supported by the fixture 220. Further, each contact surface 236 may have an aerodynamic contour that corresponds to the aerodynamic contour of the outer surface 114 of the blade component 110. Such contour facilitates the maintenance of the aerodynamic contour of the outer surface 114 of the blade component 110 during joining with the blade component 100.

Further, in exemplary embodiments, the inserts 232 may be removable and interchangeable. For example, each insert 232 being removably connectable to the base 230 and/or frame 222. The contact surface 236 of each insert 232 may have a different aerodynamic contour which corresponds to the aerodynamic contour of the outer surface 114 of a different blade component 110. Three inserts 232, 232', 232" are illustrated, with each having a contact surface 236 with a different aerodynamic contour. For example, insert 232 may correspond to the aerodynamic contour of the outer surface of leading edge segment 24, insert 232" may correspond to the aerodynamic contour of the outer surface of trailing edge segment 26, and insert 232' may correspond to the aerodynamic contour of another suitable blade segment 21 or blade component 110. A suitable insert 232, 232', 232" may be connected to the base 230 and/or frame 222 to correspond to the blade component 110 being supported and joined to blade component 100.

Referring now to FIG. 7, fixture 220 may further include, for example, an inflatable bladder 240. The bladder 240 may, for example, be inflated with air or another suitable gas. Bladder 240 may be configured for contacting the inner surface 112 of the blade component 110. For example, bladder 240 may, when the blade component 110 is supported by fixture 220 (such as the frame 222 thereof) be positioned proximate the inner surface 112 and inflated such that the bladder 240 contacts the inner surface 112. Because the bladder 240 is inflatable, it may conform to inner surface 112 when inflated and in contact with the inner surface 112, and may thus further support the blade component 110 and facilitate maintenance of the aerodynamic contour during joining of the blade component 110 with blade component 100.

Fixture 200 may further include one or more electrical connectors 242 which may be configured for connecting to heating elements 244 as discussed herein. The heating elements 244 may, for example, be heated to join the blade components 100, 110. Electricity may be provided to the heating elements 244 by the electrical connectors 242, and may be provided to the electrical connectors 242 by a power source 246.

It should be understood that the present disclosure is not limited to thus use of such fixture components for the second blade component 110. Rather, such fixture components may additionally be utilized to support first blade component 100 and maintain the aerodynamic contour of the first blade component 100 as well if required or desired.

Referring now to FIGS. 6 through 10, a method 300 for joining blade components 100, 110 of a rotor blade 16 may include, for example, the step 310 of positioning the first blade component 100 and the second blade component 110 such that the joint locations 106, 116 are proximate each other. In some embodiments, the joint locations 106, 116 may contact each other. In other embodiments, additional components (such as an insert having an energy absorptive pigment embedded therein if laser welding is being utilized) may be disposed between the joint locations 106, 116. The blade components 100, 110 may, for example, be supported by the fixtures 210, 220 when positioned such that the joint locations 106, 116 are proximate each other.

Figure 10:
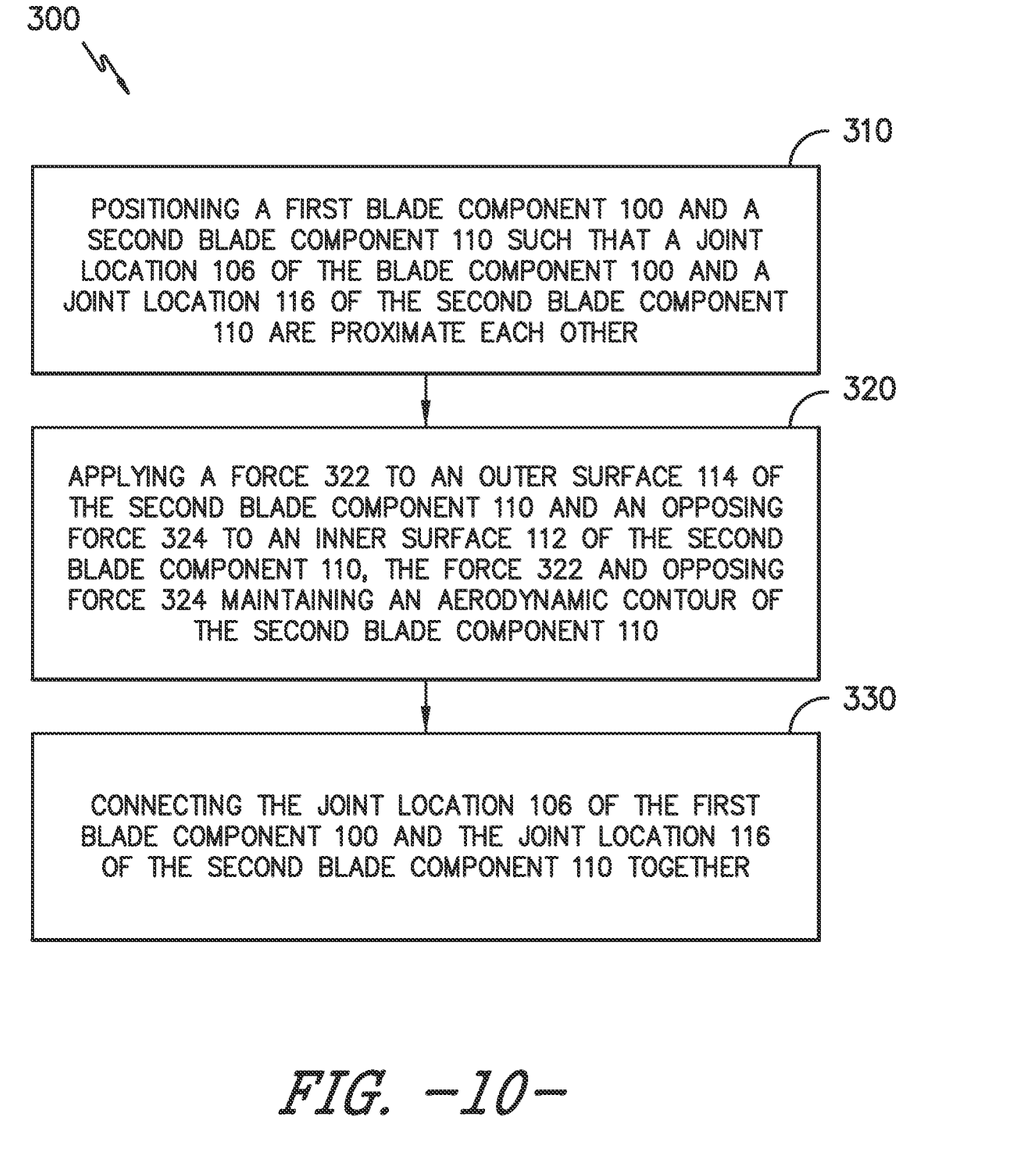
FIG. 10 is a flow chart illustrating a method in accordance with one embodiment of the present disclosure.

Method 300 may further include, for example, the step 320 of applying a force 322 to the outer surface 114 of the blade component 110 and an opposing force 324 to the inner surface 112 of the blade component 110. The direction of the force 322 may, for example, be towards the inner surface 112, and the direction of the opposing force 324 may, for example, be towards the outer surface 114. Any suitable components may be utilized to apply the forces 322, 324. In exemplary embodiments, the force 322 may be applied by the fixture arm(s) 224. In some embodiments, for example, the arm(s) 224 may be rotated into position in contact with the outer surface 114, and may be positioned such that a desired force 322 is being applied to the outer surface 114. In other embodiments, the arm(s) 224 may be fixed, and the force 322 may be applied as a reaction to the force 324. In exemplary embodiments, the force 324 may be applied by the inflatable bladder 240. Alternatively, the force 324 may be applied by any suitable fixed or movable fixture component, such as a cradle, arm, or other suitable component.

Advantageously, the force 322 and force 324 may maintain the aerodynamic contour of the blade component 110 during joining of the blade components 100, 110 together. For example, the forces 322, 324 may support the blade component 110 in place during joining, thus reducing or preventing movement of the blade component 110 and potential deformation of the outer surface 114 and loss of aerodynamic contour during joining.

Method 300 may further include, for example, the step 330 of connecting the joint location 106 and the joint location 116 together. In exemplary embodiments, the connecting step 330 may include welding of the joint locations 106, 116 together. For example, as discussed, the rotor blade 16 may include a thermoplastic resin. The thermoplastic resin may be included in the blade components 100, 110 and joint locations 106, 116 thereof. A blade component 100, 110 may thus include, and be formed at least partially from, a thermoplastic resin. In some embodiments, the resin may be a neat resin which is free from fibers. In other embodiments, the blade components may include fiber reinforced thermoplastic composites, which may include the thermoplastic resin and a plurality of fibers embedded in the thermoplastic resin as discussed herein.

Notably, a blade component may in exemplary embodiments be formed from a plurality of layers, or plies. One or more of the plies may thus include the thermoplastic resin and/or composite as discussed.

In some embodiments, an entire blade component may include the thermoplastic resin (and, optionally, composite including the thermoplastic resin and fibers). Alternatively, only one or more localized portions of a blade component may include the thermoplastic resin (and, optionally, composite including the thermoplastic resin and fibers). For example, one or more localized portions may include the thermoplastic resin, while the remainder of a blade component may include a thermoset resin (and, optionally, a composite which includes the thermoset resin and fibers embedded therein). At least one localized portion may be a joint portion which is utilized to form a joint connecting a blade component to a mating blade component.

Welding may include welding the thermoplastic resin of the blade components 100, 110 together, such as at the joint locations 106, 116 between the components 100, 110 when aligned proximate each other. Any suitable welding process may be utilized to weld the blade components together. For example, suitable welding techniques may include resistive welding, hot gas welding, speed tip welding, extrusion welding, contact welding, hot plate welding, high frequency welding, induction welding, injection welding, ultrasonic welding, friction welding, laser welding, or solvent welding.

In exemplary embodiments, welding may include heating the thermoplastic resins of the blade components, such as at the joint locations 106, 116. For example, as discussed, a heating element 244, such as a resistive heating element 244, may be provided between the blade components 100, 110, such as between the joint locations 106, 116. The heating element 244 may, for example, be embedded in one of the blade components 100, 110, such as at the joint location 106, 116 thereof or may be disposed on the surface of one of the blade components 100, 110, such as at the joint location 106, 116 thereof. Electrical connector(s) 242, which may for example be conductive wires or other suitable components configured to transmit electricity therethrough, may be connected to the heating element 244. The electrical connectors 242 may be connected to a power source 246 from which the electrical connectors 242 receive electricity. Electricity being transmitted from the electrical connectors 242 to the heating element 244 may cause the heating element 244 to heat up, thus heating the thermoplastic resins of the blade components, such as at the joining location between the blade components. The resins may, for example, be heated to above the melting points of the resins in order to facilitate joining thereof via welding.

To further facilitate welding, in exemplary embodiments, the rotor blade 16 (such as the blade components 100, 110 thereof), such as the thermoplastic resins thereof, may be cooled, such as after heating. Cooling allows the resins to re-solidify and the bonds between the blade components to be completed at the interface therebetween. In some embodiments, cooling is performed by simply allowing the rotor blade 16 (and blade components 100, 110 thereof) to rest in an ambient temperature environment. In other embodiments, suitable active cooling techniques utilizing cooled air or another suitable gas or liquid may be utilized.

Methods for assembling rotor blades 16 in accordance with the present disclosure provide numerous advantages. In particular, methods in accordance with the present disclosure facilitate efficient and cost-effective rotor blade 16 assembly. Further, the aerodynamic contours of the various pre-formed blade components can be advantageously maintained during joining together with other pre-formed blade components to form the rotor blade 16.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for joining blade components of a wind turbine rotor blade, the method comprising:
    positioning a first pre-formed wind turbine blade component and a second pre-formed wind turbine blade component such that a joint location of the first pre-formed wind turbine blade component and a joint location of the second pre-formed wind turbine blade component are proximate each other;
    applying a force to an outer surface of the second pre-formed wind turbine blade component;
    inflating a bladder such that, when the bladder is inflated, the bladder directly contacts an inner surface of the second pre-formed wind turbine blade component to apply an opposing force to the inner surface, the force and the opposing force maintaining an aerodynamic contour of the second pre-formed wind turbine blade component; and
    heating the joint location of the first pre-formed wind turbine blade component and the joint location of the second pre-formed wind turbine blade component when the force is being applied to the outer surface and the opposing force is being applied to the inner surface by the bladder to weld the first pre-formed wind turbine blade component and the second pre-formed wind turbine blade component together.

2. The method of claim 1, wherein the force is applied by a fixture arm in contact with the outer surface of the second pre-formed wind turbine blade component.

3. The method of claim 2, wherein the fixture arm is rotatable about an axis of a fixture frame.

4. The method of claim 3, wherein applying the force comprises rotating the fixture arm about the axis.

5. The method of claim 2, wherein the fixture arm comprises a base and an insert removably connected to the base, the insert having a contact surface that conforms to the aerodynamic contour of the second pre-formed wind turbine blade component.

6. The method of claim 1, wherein the first pre-formed wind turbine blade component and the second pre-formed wind turbine blade component each comprise a thermoplastic resin.

7. The method of claim 1, wherein the heating step comprises heating a resistive heating element disposed proximate the joint location of the first pre-formed wind turbine blade component and the joint location of the second pre-formed wind turbine blade component such that heating of the resistive heating element heats the joint location of the first pre-formed wind turbine blade component and the joint location of the second pre-formed wind turbine blade component.

8. The method of claim 1, wherein second pre-formed wind turbine blade component is a wind turbine blade segment.

9. The method of claim 1, wherein the first pre-formed wind turbine blade component is one of a wind turbine blade root section, a wind turbine blade tip section, or a wind turbine spar cap.

10. The method of claim 1, wherein at least one of the first pre-formed wind turbine blade component or the second pre-formed wind turbine blade component comprises a thermoset resin and a localized portion of thermoplastic plastic resin.

11. The method of claim 1, wherein the first pre-formed wind turbine blade component and the second pre-formed wind turbine blade component are formed of a mixture of hardened resin and fibers.

12. A method for joining blade components of a wind turbine rotor blade, the method comprising:
    positioning a first pre-formed wind turbine blade component and a second pre-formed wind turbine blade component such that a joint location of the first pre-formed wind turbine blade component and a joint location of the second pre-formed wind turbine blade component are proximate each other, wherein the first pre-formed wind turbine blade component and the second pre-formed wind turbine blade component each comprise a thermoplastic resin;
    applying a force to an outer surface of the second pre-formed wind turbine blade component;
    inflating a bladder such that, when the bladder is inflated, the bladder directly contacts an inner surface of the second pre-formed wind turbine blade component to apply an opposing force to the inner surface, the force and the opposing force maintaining an aerodynamic contour of the second pre-formed wind turbine blade component; and
    heating the joint location of the first pre-formed wind turbine blade component and the joint location of the second pre-formed wind turbine blade component when the force is being applied to the outer surface and the opposing force is being applied to the inner surface by the bladder to weld the first pre-formed wind turbine blade component and the second pre-formed wind turbine blade component together.

13. The method of claim 12, wherein the force is applied by a fixture arm in contact with the outer surface of the second pre-formed wind turbine blade component.

14. The method of claim 13, wherein the fixture arm is rotatable about an axis of a fixture frame.

15. The method of claim 14, wherein applying the force comprises rotating the fixture arm about the axis.

16. The method of claim 13, wherein the fixture arm comprises a base and an insert removably connected to the base, the insert having a contact surface that conforms to the aerodynamic contour of the second pre-formed wind turbine blade component.

* * * * *